July 1, 1969
W. J. FLITTIE
3,452,715
LIVESTOCK FEEDING METHOD
Original Filed Oct. 31, 1966
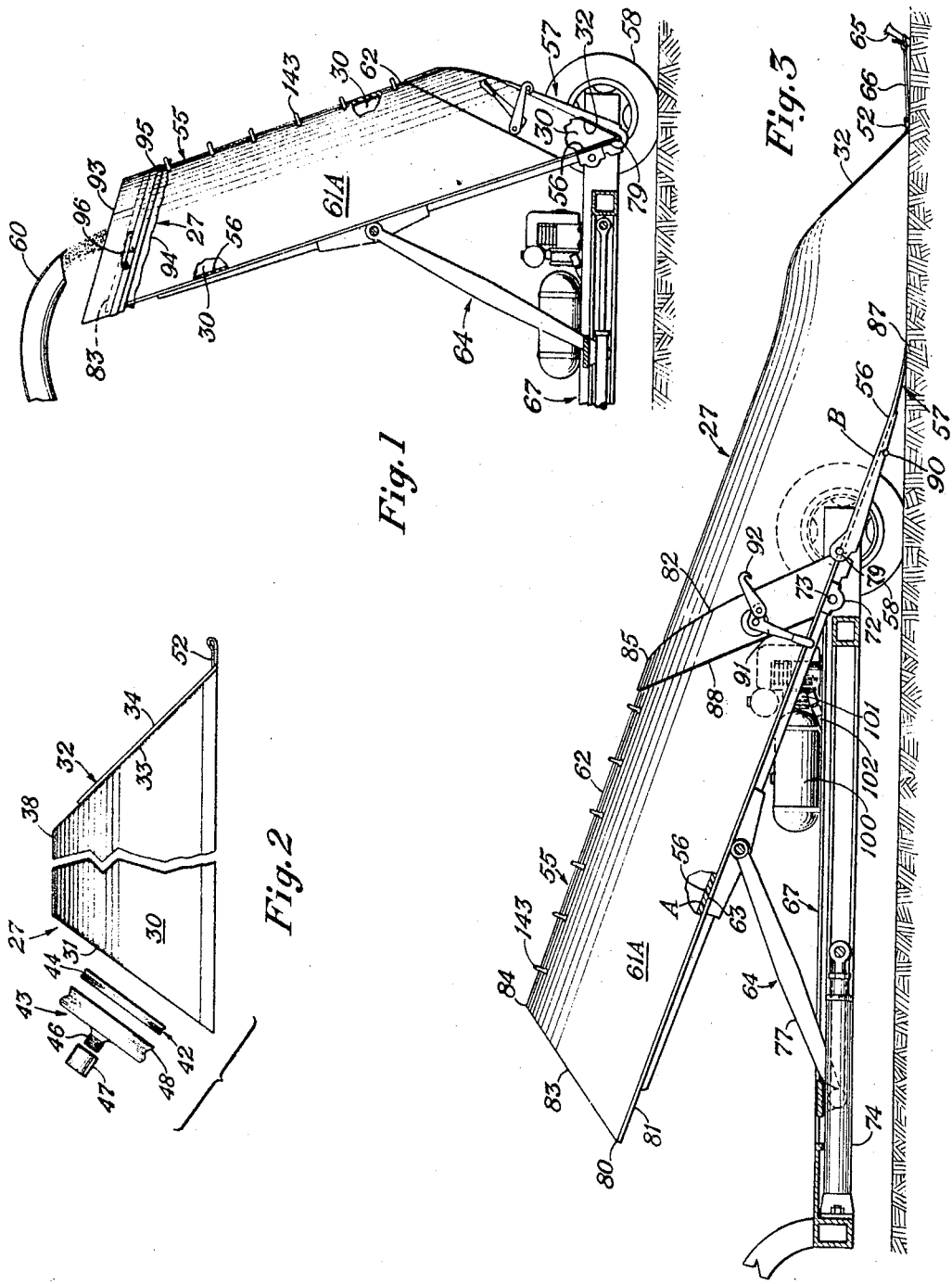
WILLIAM J. FLITTIE
INVENTOR
BY *H.C. Goldwire*
ATTORNEY United States Patent Office 3,452,715
Patented July 1, 1969

3,452,715
LIVESTOCK FEEDING METHOD
William J. Flittie, Dallas, Tex., assignor of one-tenth to Henry C. Goldwire, Irving, Tex.
Original application Oct. 31, 1966, Ser. No. 590,866. Divided and this application Sept. 20, 1968, Ser. No. 761,203
Int. Cl. A01k 5/00; A01f 35/00
U.S. Cl. 119—51                                    5 Claims

ABSTRACT OF THE DISCLOSURE

A method of feeding, to a given number of animals, feedstuff plant material borne on a tract of ground. The feedstuff is enclosed in a plurality of closed containers distribtued over the tract. The animals are then brought onto the tract and the containers are successively opened to make their contents accessible to the animals at a rate at which substantially all container contents exposed to air are utilized before another container is opened. Fermentation of the plant material in the container before the container is opened converts the feedstuff material into silage.

---

This application is a division of my co-pending application 590,866 filed on Oct. 31, 1966, to which reference is made for incorporation hereinto of all pertinent matter thereof not expressly set out below.

This invention relates to agricultural methods and, more particularly, to a method of feeding feedstuff plant material.

While exemplary means for implementing the method of the present invention are set forth herein, reference is made to the above-identified, co-pending application for extensive information concerning the mode of construction and operation of such means and modifications thereof.

It is a major object of the present invention to provide a method for processing and feeding ground-borne feedstuff plants which drastically reduces the labor and equipment involved and results in feed of low cost but excellent quality.

Another object is to provide a method for feeding feedstuff plants which ends the wastage of feed resulting from spoilage of the feed upon contact with the air.

A further object is to provide a method of ensilaging and feeding feedstuff plant materials which permits feeding the resulting silage in a manner providing economically significant benefit to the land on which the feedstuff plants were grown and eliminating the expense of appropriating land for feed lot purposes and the concomitant injury to the land.

A still further object is to provide a method for feeding feedstuff plants which makes it possible to provide cattle and the like with more attractive, comfortable, and hygienic feeding conditions.

Still another object is to provide a method for feeding feedstuff plants enabling much more economical feeding of dairy animals and wintering and other maintenance feeding of animals, which method in addition enables a single farmer to fatten cattle or the like more cheaply than can a commercial feed lot.

An additional object is to provide a feeding method which makes possible a sharply reduced use of antibiotics and the like in fattening cattle and other animals.

Another object is to provide a feeding method for importantly increasing and stabilizing the income and promoting the security and independence of the operator of a one-man or other relatively small farm while enabling him to place into commerce an increased quantity of high-quality meat animals at lower prices.

Further objects and advantages will be apparent from the specification and claims and from the accompanying drawing.

In the drawing:

FIGURE 1 is a side elevational view of a receiver for holding a container, the receiver being tilted to one possible loading position;

FIGURE 2 is a side elevational view of an embodiment of a capsule or container; and FIGURE 3 is a view similar to FIGURE 1 but with the receiver tilted to a lesser angle.

With reference to FIGURE 1, there is shown the discharge spout 60 of a machine which, when moved over ground bearing cut or standing feedstuff plant material, severs and places itself in supporting relation to the material, then expels it. The severing is accomplished when the machine chops portions of plants from other portions thereof plants is severed by the machine to reduce the plant portions to still smaller size. Such further division or chopping of plant material already severed from ground-attached portions of the plants is accomplished (for example) by a field chopper which also performs the separation of the plant portions concerned from ground-attached portions of the plants. Since field choppers are well known, only the spout 60 thereof is shown.

The expelled plant material is received directly from the spout 60 of the machine into a closeable container 27 such as shown, for example, in FIGURE 2. The container 27 is of substantially air-impervious construction and has, for example, a tabular sidewall 30 made of a plastic material such as polyethylene and, at one of its ends, having an end wall or closure member 32. The container 27 is closable by tying closed its remaining open end 31 with wire, etc.; and other closure means, such as the items 42, 43, are disclosed in the above-referenced application and need not be discussed herein.

Returning to FIGURE 1, the container 27 is mounted in a tubular receiver 55 or the like having a rear closure member 57 against which the container end wall 32 rests, a bottom wall having a surface 56 that supports the bottom side of the container sidewall 30, and top and side walls that contact the top and side portions of the tubular container sidewall 30 and support the container against expansive forces placed upon it by the feedstuff deposited therein from the spout 60. The receiver 55 thus determines the filled shape of the container, which shape is elongated and preferably of a width approximately twice the feeding reach, from its front feet, of a representative one of a given number of animals to be fed the plant material in the container. The receiver is supported and rendered mobile by a chassis 67 with wheels 58 or the like and is moved, bearing the container with it, in coordination with the machine bearing spout 60 and relative to the ground-borne plant material in order to receive the plant material into the container through its open end defined by forward-end material 94 of the container turned back, in the manner of a cuff, on the forward end of the tubular receiver. The container is thus filled until it contains a mass of feedstuff consumable, by the given number of animals to receive it and while the mass is exposed to air, before significantly harmful deterioration of the material forming the mass occurs.

Such filling having been accomplished, the container 27 is deposited on the ground in the approximate location where its filling was completed in the manner described above. One mode of accomplishing this deposition is to pivot the receiver 55 on its mounting 73 (FIGURE 3) attaching it to the chassis 67 supported by the wheels 58 and thereby bring it to an angle to the ground at which the container 27 will not precipitously slide within the receiver. It will be understood that the end of chassis 67 opposite wheels 58 is suitably supported, as by one or more additional wheels (not shown). The receiver rear-end closure means 57 is then swung to a position in which the container 27 is free to move in the receiver, and the container is slide from the receiver and onto the ground. Prior or subsequent to depositng the container 27 on the ground, its open end is closed as mentioned above, this to exclude air from the container.

The above process is repeated until all that is desired of the ground-borne plant material on the tract in which it is located is in a plurality of containers such as described, which containers are on the ground. A given number of animals to which the material in the containers is to be fed is then brought onto the tract; and successive ones of the containers are opened to make their contents consumable, directly from the containers, by the animals. Successive containers are opened at a rate no greater than that at which substantially all the contents of one container exposed to air by the opening are consumed before the next container is opened; and this routine is continued until all the feed in the containers has been fed.

Before opening each container, the contents thereof desirably are fermented by action of bacteria on the feedstuff after the feedstuff is placed in the container. Naturally occurring bacteria, for example, are adequate for accomplishing the fermentation, which converts the feedstuff material into silage while the associated container is on the ground. Exclusion of air from the container is continued during the fermentation and until the container is opened for feeding its contents to the animals. To the extent necessary in a given application, the gases evolved during fermentation are vented from the container to prevent rupture of the latter. Because it premits sealing of the feedstuff from the air promptly after the feedstuff is taken from the ground, a silage of excellent quality is produced by the above method.

For best results in the ordinary situation, the number of animals to be fed is chosen to provide a group of individuals of such size that, upon all of the silage and any desired feed supplements having been fed to them, they will have arrived at a desired stage in their nutritional histories. Such a stage may be the arrival of another spring and the renewed availabality of other feeds; another and important stage is a finished state of fattening for slaughter.

In connection with the feeding method, it is advisable to provide about each capsule, when it is opened, a barrier which will prevent the animals from reaching the feed with more than their heads. This will prevent trampling, fouling, and other wastage of the feed while allowing the animals to consume it directly from the opened capsule; if desired, the barrier may be made to give some support to the capsule as well.

When the animals to be fed the silage thus produced are brought into the field, the only labor essentially needed to make the feed available to them is that required for opening successive capsules as the feed therein is needed for consumption. By slitting or removing only its top, a capsule forms a clean and convenient feeding trough; after the feed is all consumed, the capsule is discarded. The expenses of a silo, and of the labor and machinery for filling it, thus are avoided. While a silo and such machinery can only be depreciated, for tax purposes, over an applicable number of years, a disposable capsule is immediately deductible from gross income, for all its cost, in the year of use.

Since the silage is fed, in the spaced locations where the capsules become filled and unoaded, on the very ground where the silage was produced, no separate feedlot is necessary. A given area of ground experiences a sustained, high concentration of the fed animals for only several days, hence is not injured; and the relatively even distribution of all the elimination products of the animals over all the field is highly beneficial to the land and is obtained at no cost. A further result is that the animals have clean and attractive feeding and living conditions which maintain their health and appetites, and little or no antibiotics, etc. need be introduced into their feed. Meanwhile, if feed supplements are desired, these are readily introduced at the time of depositing the feed in the capsule, or such introduction is accomplished by placing the supplements on the finished silage after each capsule is opened. The combination of healthful feeding conditions and a feed of superior palatability and food value results in maximum assimilative powers and gain of the animals fed. Since the capsules are opened in coordination with the nutritional demand of the group of animals fed, there is no spoilage and consequent wastage of the feed; and all the heavy labor and expense of removing feed from a silo and transporting it to feed troughs is saved.

The invention offers especially important economic advantage to farmers in the sub-humid areas of this and other countries, i.e., areas without consistently sufficient rainfall to ensure good yields of corn, but with rainfall sufficient to produce profitably other feed crops, notably milo maize. Since these areas are large relative to the areas of high corn production, and since it is in them that much of the feeder livestock production takes place, the livestock thus are readily on hand for feeding. Upon resolving uncertainties and variables in favor, in each instance, of the higher figure, the 1966 cost per animal being fattened, to a farmer employing the present invention, is no more than 25¢ per day, the elements of such cost including land taxes, plowing, seeding, cultivation or equivalent, fertilizer, harvesting into the capsule or container, and feed supplements, this where a 30-bushel per acre milo maize crop is produced. (In some areas, a 60-bushel crop is reliably produced.) Feeding 700-pound yearling cattle over 150 days with a normally good weight gain of 2½ pounds per day, and with a sale price for finished beef animals of $22/100 after a purchase price for feeders of $20/100, the net on each animal is $59 per head, or approximately $40 per acre of the land on which the crop was produced. By contrast, a farmer selling only the seed from the same crop, at a price consistent with the beef prices noted above, could expect a net return of only $13 per acre. In further contrast, the cost of feeding cattle in a commercial feedlot is not less than 50¢ per animal per day. Thus, the operator of even a one-man farm is enabled, by the invention, to fatten cattle at a price giving him a greatly superior competitive advantage over a commercial feedlot operation. Meanwhile, since milo maize (for one example) is a highly reliable crop under year-to-year changes in weather conditions, the income of the farmer is not only greatly improved, but is stabilized. At the same time that his security and economic independence are increased, he is enabled to place into commerce an increased quantity of high-quality meat animals at lower prices, thus providing needed benefit to the ultimate consumer.

While only one example of the method of the invention, together with modifications thereof, has been disclosed herein, it will be evident that still other modifications are possible in its steps without departing from the scope of the invention.

I claim:
1. The method of feeding, to a given number of animals, feedstuff plant material borne on ground of a tract, said method comprising:
   moving over the ground bearing the feedstuff material a machine which severs and places itself in supporting relation to the material and expells it;
   receiving the expelled plant material directly from the machine into a closeable container of substantially air-impervious construction while moving the container in coordination with said machine relative to the ground-borne material to fill the container sufficiently to form therein a mass of size consumable by the given number of animals, while the mass is exposed to air, before significant deterioration of the material forming the mass occurs;
   depositing the container on the ground in the approximate location at which, while being moved relative to the ground-borne material, its above-stated filling was completed;

excluding air from the container;

repeating the preceding steps until all that is desired of the ground-borne feedstuff plant material on the tract is in a plurality of containers of substantially air-impervious construction and on the ground;

bringing the given number of animals onto the tract; and opening successive ones of the containers, to make their contents consumable by the animals directly therefrom, at a rate no greater than that at which substantially all container contents exposed to air by opening are consumed before another container is opened.

2. The method of claim 1, further comprising the step of shaping the mass into an elongated configuration of width approximately twice the feeding reach, from its front feet, of a representative one of the given number of animals.

3. The method of claim 1, further comprising the step of chopping the severed material to divide it more finely than when severed.

4. The method of claim 1, further comprising the step of fermenting the feedstuff in each of the containers after the associated container is placed on the ground and while continuing to exclude air from the container.

5. The method of claim 4, wherein fermentation gases are vented from each container during fermentation of the feedstuff therein.

References Cited

UNITED STATES PATENTS

| | | | |
|---|---|---|---|
| 2,379,371 | 6/1945 | Moschel | 55—118 |
| 3,162,003 | 12/1964 | Schapansky | 56—19 |
| 3,181,506 | 5/1965 | Seymour | 119—56 |
| 3,222,853 | 12/1965 | Michael | 56—202 |
| 3,242,658 | 3/1966 | Morales | 56—22 |
| 3,333,574 | 8/1967 | Harris | 119—51 |

FOREIGN PATENTS 468,940  7/1937  Great Britain.

ALDRICH F. MEDBERY, *Primary Examiner.*

U.S. Cl. X.R.

119—61

PO-1050
(5/69)

UNITED STATES PATENT OFFICE
CERTIFICATE OF CORRECTION

Patent No. 3,452,715                    Dated   July 1, 1969

Inventor(s)     William J. Flittie

It is certified that error appears in the above-identified patent and that said Letters Patent are hereby corrected as shown below:

Column 2, line 17, after "thereof" insert -- left in or on the ground; or material already cut from the --; line 30, "tabular" should read -- tubular --. Column 3, line 4, "slide" should read -- slid --; line 32, "premits" should read -- permits --.

SIGNED AND
SEALED

DEC 2 - 1969

(SEAL)
Attest:

Edward M. Fletcher, Jr.
Attesting Officer

WILLIAM E. SCHUYLER, J
Commissioner of Patent